United States Patent [19]

Tamura

[11] Patent Number: 5,721,926
[45] Date of Patent: Feb. 24, 1998

[54] CORRESPONDENCE-ORIENTED STATE-TRANSITION-MODEL-BASED PROGRAMMING SYSTEMS

[75] Inventor: Kazuyoshi Tamura, Fuchu, Japan

[73] Assignee: Kabushiki Kaisha Toshiba, Kawasaki, Japan

[21] Appl. No.: 178,654

[22] Filed: Jan. 7, 1994

[30] Foreign Application Priority Data

Jan. 12, 1993 [JP] Japan .................................. 5-003246

[51] Int. Cl.$^6$ .................................................. G06F 9/44
[52] U.S. Cl. .................................................. 395/701; 364/578
[58] Field of Search .................................................. 395/700, 500, 395/701, 702; 364/578, 701, 702

[56] References Cited

U.S. PATENT DOCUMENTS 4,802,116  1/1989  Ward et al. ........................ 364/900
5,485,600  1/1996  Joseph et al. ...................... 395/500

FOREIGN PATENT DOCUMENTS 2-50205  2/1990  Japan .
4-75135  3/1992  Japan .

*Primary Examiner*—Kevin A. Kriess
*Assistant Examiner*—Kakali Chaki
*Attorney, Agent, or Firm*—Oblon, Spivak, McClelland, Maier & Neustadt, P.C.

[57] ABSTRACT

It is an object of the present invention to provide a state-transition-model-based programming system where the program data structure is simple and compact. To achieve this object, one or more specifications comprising a program are entered from the input unit (11) and specification input section (12) in the from of state transition models. The specification storage means (21) stores the specifications. The specification execution section (32) executes the specifications. When one of the beginning conditions is satisfied, the priority processing section (33) changes the specification to the next specification corresponding to the beginning condition. The change processing section (34) determines the beginning state of the next specification according to the correspondence stored in the state map storage means.

44 Claims, 21 Drawing Sheets

SPECIFICATION 51
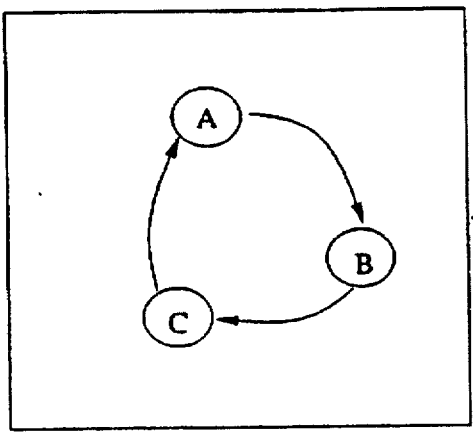
SPECIFICATION 52
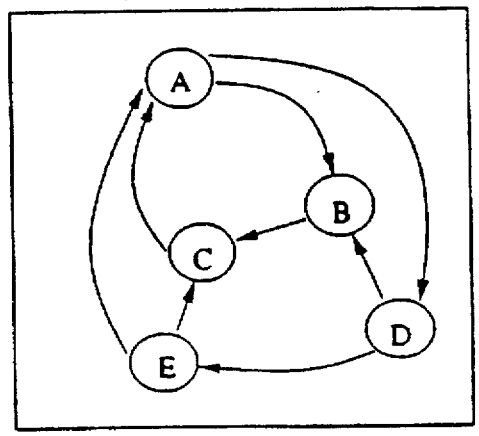
FIG. -2
| SPECIFICATION NAME | BEGINNING CONDITION | PRIORITY |
|---|---|---|
| SPECIFICATION 51 | a | 1 |
| SPECIFICATION 52 | b | 2 |
| SPECIFICATION 53 | c | 3 |
FIG. -3

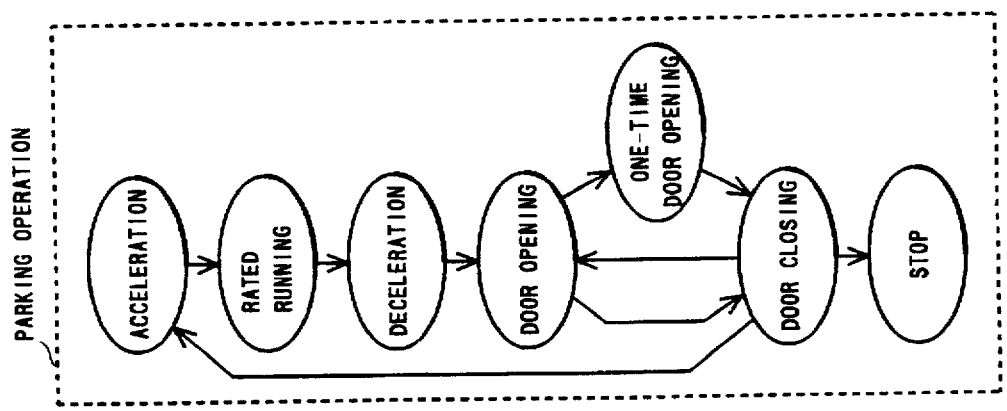
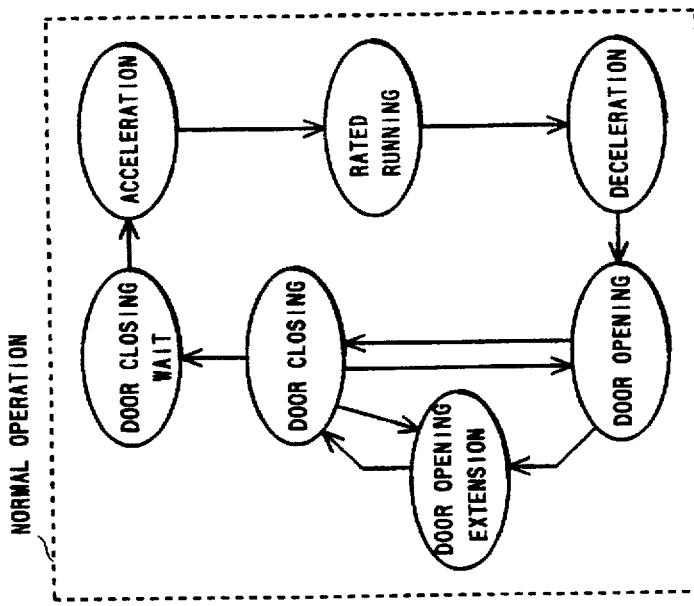
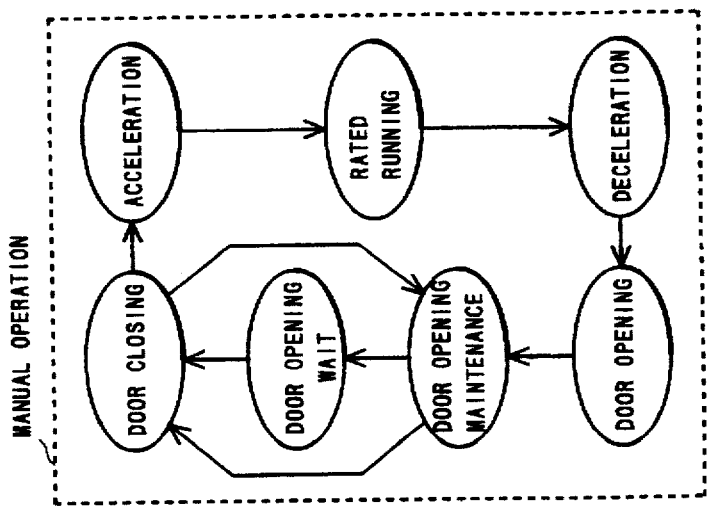
FIG. -9

| SPECIFICATION NAME | BEGINNING CONDITION |
|---|---|
| PARKING OPERATION | PARKING TIME or PARKING SWITCH ON |
| MANUAL OPERATION | MANUAL SWITCH ON |
| NORMAL OPERATION | ALL SPECIAL SWITCHES OFF |

FIG. -10

|   | A | B | C |
|---|---|---|---|
| A |   | EVENT / ACTION |   |
| B |   |   | EVENT / ACTION |
| C |   |   |   |

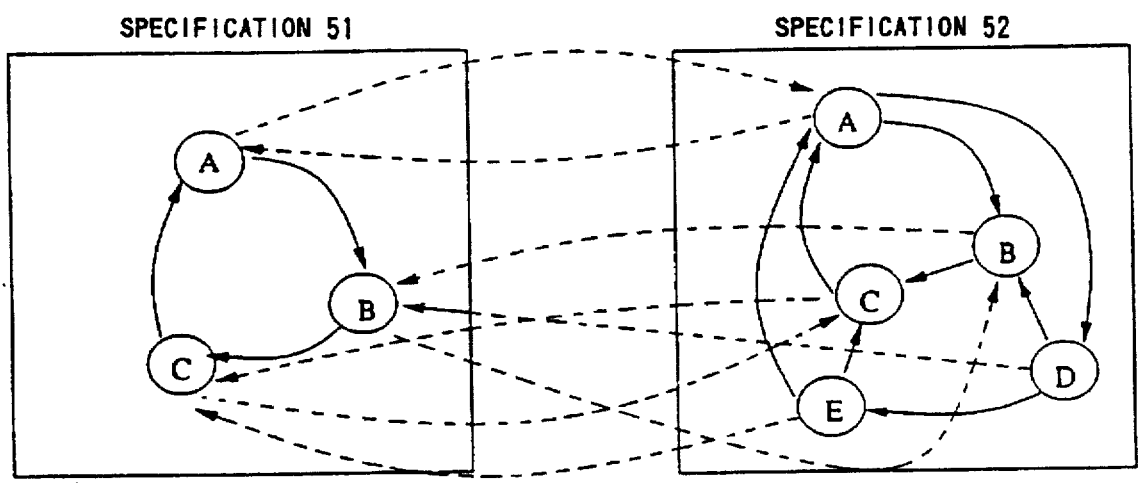
F I G. -21

CORRESPONDENCE-ORIENTED STATE-TRANSITION-MODEL-BASED PROGRAMMING SYSTEMS

FIELD OF THE INVENTION

The invention is concerned with State-Transition-Model-Based Programming Systems which input and execute specifications that represents the functions of programs for realizing automatic operation of various objects in the form of State-Transition-Model.

BACKGROUND ART

Conventionally, a state-transition-model-based programming system has been used in the execution of various types of program such as device automatic control programs. This state transition model, one of model formats for representing program specifications, represents a specification with the use of program states and the transitions among these states. A state-transition-model-based programming system is a programming system which is based on this state transition model. In general, each program of this programming system consists of a plurality of specifications, each of which is described using a state transition diagram which represents a state transition model of the corresponding specification.

Each of these specifications comprising this type of program has its own function, and a specification to be executed must be changed according to conditions. For example, an automatic elevator-control program consists of the specifications for various modes such as automatic operation, manual operation, and emergency control, each of which has its own beginning condition. These specifications are changed and executed as conditions change.

To ensure compatibility between the specifications at change time, this state-transition-model-based programming system must define the correspondence between each state of each specification and the beginning state of the next specification to be executed immediately after specification change.

In a conventional state-transition-model-based programming system, the beginning conditions of a state and its correspondence information at change time are stored with the specification of the state. More specifically, they are defined as the transition conditions and transition destinations for each state.

However, as a program becomes more complicated and sophisticated recently, the number of specifications is increased and their contents become more complicated. The correspondence between states also becomes complicated. This makes it difficult to understand the program, decreasing the efficiency of data entry and system maintenance. And, because the amount of data describing the correspondence between states has increased, large storage is needed and therefore the storage cost is increased.

In particular, in the above-mentioned specification change time, when a plurality of beginning conditions exist for a plurality of specifications, each corresponding to a specification, and these conditions may be satisfied at the same time, it is necessary to set up complicated beginning conditions or to define specification priority in order to prevent a plurality of conditions from being satisfied at the same time. For example, in the above-mentioned elevator example, manual operation must have priority over automatic operation when the manual switch is pressed during automatic operation. Similarly, emergency control must be exercised to stop the elevator at the nearest floor when emergency conditions such as an earthquake occurs.

In this case, in a conventional state-transition-model-based programming system where change conditions or correspondences are represented as state transitions, not only the contents of specifications become more complicated but also a complicated transition condition must be described repeatedly for each state transition. That is, to start a specification under a certain beginning condition, the beginning condition of the specification must be checked in all the states of all other specifications. This makes the amount of program data extremely large, making the above-mentioned problems more serious (Reference: Japanese Non-Examined Patent Publication No. 4-75135, Japanese Non-Examined Patent Publication No. 2-50205).

Referring to FIG. 21, there is shown a state transition diagram of a specification of a conventional state-transition-model-based programming system. FIG. 21 shows specifications 51 and 52. Nodes, indicated by circles, represent states A–E of specifications 51 and 52, while solid arrows between nodes represent the state transitions among states A–E. In this example, in addition to normal transitions within each of specifications 51 and 52, broken lines are used as to show the transitions of states A–E between specifications 51 and 52, making it difficult to understand the diagram.

Referring to FIG. 22, there is shown a more complicated state transition diagram. In this figure, an ellipse represents a state, a plurality of ellipses enclosed by chained lines represent specifications, and arrows represent transitions. This diagram containing a large number of transitions is rather difficult to understand; however, some actual programs are still larger and, therefore, it is difficult to process them with conventional state-transition-model-based programming systems.

A transition is represented by an arrow in this diagram. However, in an actual specification, a transition contains descriptions of events and actions comprising that transition. Specific descriptions vary among software applications. An example of description is as follows:

if (parking time or parking switch ON)
   then start specification [parking operation]: beginning condition is [slow down}

This information, if shown on each arrow, would make the diagram still more difficult to read.

It is an object of this invention to solve the problems of the prior art which are described above. More specifically, an object of this invention is to provide a state-transition-model-based programming system having a simple and compact data structure and to provide the execution method of a state-transition-model-based system.

DISCLOSURE OF THE INVENTION

To achieve the above-mentioned object, a program is composed of a plurality of specifications according to the present invention, and each specification is changed and executed based on a beginning condition. Each specification is entered from a specification input means in the form of a state transition model consisting of a plurality of states and the transitions between these states. For each state contained in each specification, correspondence between the state of the specification and a beginning state at which the next specification is to begin immediately after specification change is input from a correspondence input means.

Each specification is executed by a specification execution means and, when the beginning condition is satisfied, the current specification which is being executed is changed to the next specification. At this time, a beginning condition determination means determines the beginning state of the next specification based on the correspondence.

Therefore, correspondence between a beginning condition which causes a specification change and a state at this specification change time is represented as an independent description separated from that of the state transition model representing each specification according to the present invention. This means that, in the specification, specification beginning conditions and correspondences need not be described as transition destinations repeatedly and that the data structure of a program becomes simple and compact.

In addition, the correspondence is represented as simple tree-structured data according to the present invention. This makes the data structure of a program simple and compact.

Because, according to the present invention, a beginning condition of each specification may be defined with no duplication with another specification, only a single specification is selected uniquely based on the state of a control object.

BRIEF DESCRIPTION OF THE DRAWINGS

FIG. 2 shows a typical example of embodiment 1 of the present invention, FIG. 3 shows an example of priority of embodiment 1 of the present invention, FIG. 9 shows the specifications of embodiment 2 of the present invention, FIG. 10 shows the beginning conditions of embodiment 2 of the present invention, FIG. 12 shows an example of a state chart.

FIG. 21 shows an example of a specification of a conventional state-transition-model-based programming system.

Figure 1:
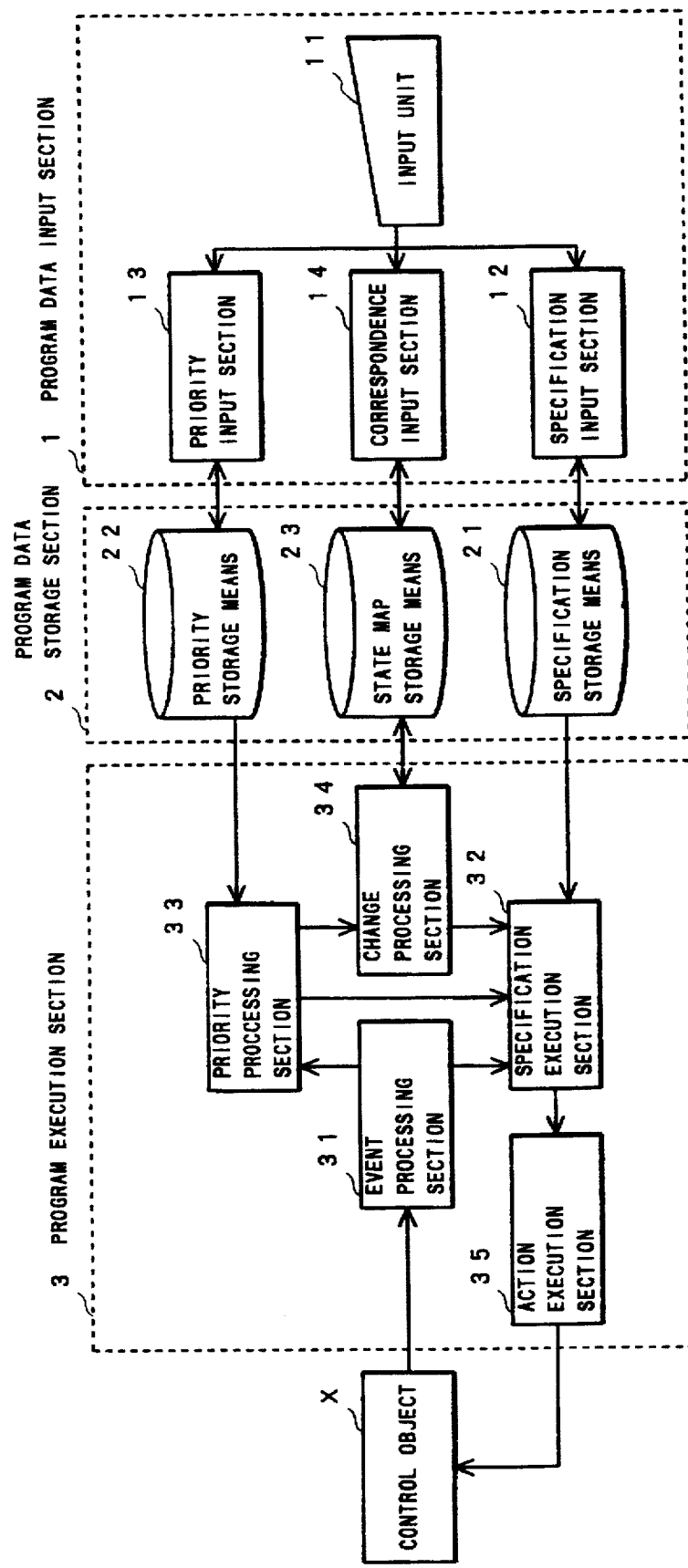
FIG. 1 is a functional block diagram illustrating the structure of embodiment 1 of the present invention.

In the Figures, 1 is a program data input section, 2 is a program data storage section, 3 is a program execution section, X is a control object, 11 is an input unit, 12 is a specification input section, 13 is a priority input section, 14 is a correspondence input section, 21 is a specification storage means, 22 is a priority storage means, 23 is a state map storage means, 31 is an event processing section, 32 is a specification execution section, 33 is a priority processing section, 34 is a change processing section, 35 is an action execution section, 51–53 are specifications, A–E are specification states, and 151 and the following numbers are steps.

BEST MODE OF CARRYING OUT THE INVENTION

The present invention will be described more specifically by way of several embodiments with reference to the accompanying drawings. Each embodiment is executed on a computer with each function of each embodiment being executed by the computer according to a specific set of steps stored as a program. Therefore, each embodiment will be described assuming that each function of each embodiment is implemented by a virtual circuit block (means).

In general, the computer has a CPU. (central processing unit) and main storage consisting of RAM (random access memory). Typically, the computer has input units such as a keyboard and a mouse, external storage units such as a hard disk, output units such as a CRT display unit or a printer, and necessary input/output control circuits.

However, the computer configuration is flexible and, as long as the present invention is carried out properly, some computer components may be added, replaced, and deleted. For example, any type of CPU may be used; a multiprocess computer will speed up processing. That is, a plurality of CPUs may be used concurrently, or a single CPU may be shared in a time-sharing (time-dividing) mode to allow a plurality of processes to be executed concurrently. A computer connected to a network may also be used. Other input units may be connected to the computer; for example, an image input unit, voice input unit, or sensor such as a touch panel, light pen, digitizer, image scanner, or video camera may be used. Other external storage units may be connected to the computer; for example, a floppy disk unit, RAM card unit, magnetic tape unit, optical disk unit, optical magnetic disk unit, bubble memory unit, or flash memory unit may be used. Other output units may be connected to the computer: for example, a liquid crystal display unit, plasma display unit, video projector, LED display unit, or acoustic generation circuit may be used.

Typically, the software of the computer includes an application program embodying each function of each embodiment, and that application program is executed under an OS (operating system). However, the software configuration of the computer may be changed according to the requirements. For example, an OS need not necessarily be used, and each function of each embodiment may be implemented by a microprogram.

Any type of programming language may be used to implement each function. Typically, machine language produced by a high-level language or an assembler is used. An interpreter such as BASIC may also be used.

Each means, which represents a concept corresponding to each function of each embodiment, does not always correspond to an independent hardware unit. A single means may consist of only one instruction in some cases or may consist of a plurality of instruction in some other cases.

A program may be stored in one of several ways. It may be stored in ROM (read-only memory), or may be stored on an external storage unit such as a hard disk for loading at computer startup time or program start time. A program may be divided into several modules based on a processing to be performed so that each module may be loaded into memory as necessary. Program modules may be stored on different type of storage unit.

Note that the term "input" in this detailed description means not only data input but also other processings closely associated with data input. Other processings include the echo-back of input data to an output unit (for confirmation) and the modification and editing of input data. Similarly, the term "output" in this detailed description means not only data output but also other processings closely associated with data input. Other processings include the input of output data ranges or prompt messages for scrolling on a display screen. In an actual embodiment, an input means and an output means may be integrated by means of an interactive interface. Similarly, the integration of input and output means is suitable for processing where the user performs processing based on output data (choices) such as "select" or "specify".

A storage means in this detailed description, which identifies where data is stored, indicates all means capable of holding a set of data for a specified period of time. Thus, a storage means in this detailed description does not indicate a specific type of storage such as an external storage unit or a specific file format. In particular, a cylinder-shaped frame in the drawings in this detailed description does not indicate a specific storage unit such as a disk unit or a specific file format.

A storage means in this detailed description indicates any type of storage which can hold a set of data for a specified period of time. Typically, a storage means is implemented as an area allocated in the main storage unit. However, a storage means may reside not only in the main storage unit but also on an external storage unit or in a register or cache memory of the CPU. When a plurality of storage means are used, they may be on storage units of the same type or different type.

In addition, the format of a storage means need not always be a file; an main memory area or an external storage unit may be accessed directly by specifying addresses or physical recording positions. A storage means may be an erasable temporary area. Permanent data such as a dictionary may be stored in a ROM.

Each storage means need not be dedicated to the present invention; a normal data recording storage unit may be used. Data contents and data formats are free; for example, a character string may be stored in character-basis code or word-basis code. Data may be copied from one storage means to another storage means.

The description of a storage means sometimes contains implicit data about the storage means. Thus, each embodiment uses, as necessary, other data for the operation of the embodiment (for example, pointers, counters, flags, parameters, buffers, etc.,).

The execution steps of each embodiment may be changed, a plurality of steps may be executed concurrently, or the steps may be executed in different sequences on each execution. The change of step execution sequence is implemented via a menu interface where a user selects one of available processings.

Unless otherwise stated, each section of each embodiment gets data from one of other sections which reads, generates, or stores the corresponding data. Data is obtained, for example, by accessing a variable or memory holding the data. To erase or delete data, data itself need not be deleted from a storage area; instead, the attribute of data may be changed, for example, by setting a data erase flag.

Although each embodiment is implemented on a computer, the whole or part of each embodiment may be implemented by a special electric circuit.

1. Embodiment 1

A object or embodiment 1 is to provide a state-transition-model-based programming system which has a compact and simple data structure and which uses correspondence. Another object of embodiment 1 is to provide state-transition-model-based programming system whose program logic is easy to understand and which uses correspondence. Another object of embodiment 1 is to provide state-transition-model-based programming system whose processing is simple and speedy and which uses correspondence.

1-1 Structure of Embodiment 1

Referring to FIG. 1, there is shown a structure diagram of embodiment 1. As shown in FIG. 1, this embodiment controls a control object X such as an elevator, and consists of the program data input section 1, the program data storage section 2 which stores program data, and the program execution section 3 which executes a program using stored data.

A plurality of specifications, which comprise a program and which are changed and executed based on specified beginning conditions, are input from the input section 1. Each of these specifications is input as a state transition model consisting of a plurality of states and the transitions between states. Although it is desirable that a state transition model be input in the form of a chart to help understand the model, it may be input in the form of character strings.

In addition, correspondence between each state of each specification and a beginning condition, on which execution is to begin in the next specification immediately after the current specification is changed to the next is input also from the input section 1.

That is, the program data input section 1 consists of the input unit 11 such as a keyboard for entering a program, the specification input section 12 which controls the input operation of specifications from the input unit 11, and the correspondence input section 14 which controls the input operation of correspondence data. The specification input section 12 and correspondence input section 14 each comprise, in conjunction of the input unit 11, the specification input means and correspondence input means, respectively.

The program data storage section 2 consists of the specification storage means 21 which stores specifications, the priority storage means 22 which stores priority data, and the state map storage means 23 which stores correspondence data. Storing program data on one of these storage means makes it easy to use the program repeatedly.

Referring to FIG. 2, there is shown an example where part of a typical specification comprising a program in embodiment 1 is illustrated. Two specifications 51 and 52 are illustrated as state transition diagrams. In these state transition diagrams, each circled node represents each of states A–E of specifications 51 and 52, and an arrow between nodes represents a state transition among states A–E. This type of specification makes it easy to understand each state and a state transition.

Priorities among the specifications of embodiment 1 are entered and stored as shown In FIG. 3. The example in FIG. 3 shows the priorities among specifications 51, 52, and 53, and also defines beginning conditions a, b, and c. That is, the input section 1, which has the priority input section 13 that controls the priority input operation, accepts priorities and beginning conditions together in a tabular format. Entering beginning conditions in a tabular format makes it easy to interpret beginning conditions.

Figure 4:
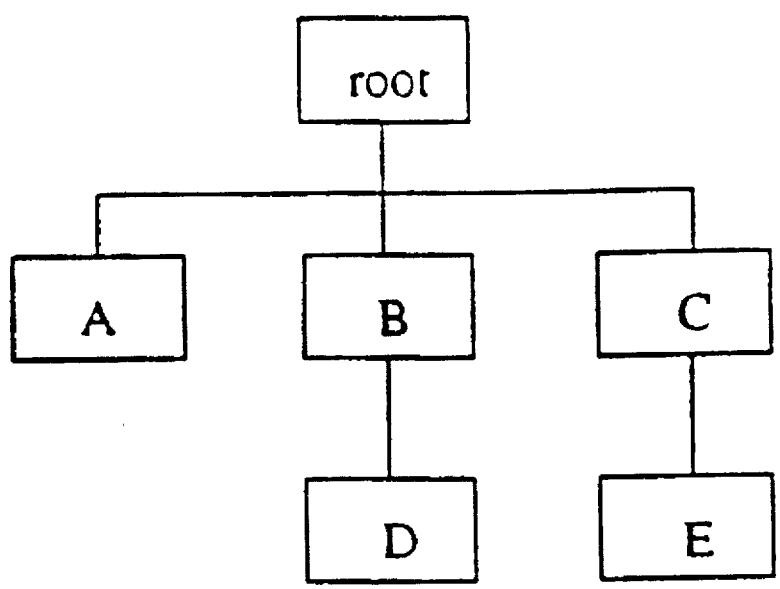
FIG. 4 shows an example of a state map of embodiment 1 of the present invention.

FIG. 4 is a state map showing the correspondence among states A-E in the specifications 51 and 52 shown in FIG. 2. This state map represents the correspondence as tree-structured data beginning with a root. A state represented by this structure may have lower-level branches. The higher level of this tree-structured data consists of higher-level states A, B, and C of the specifications 51 and 52, and lower-level states D and E, which may be changed to higher-level states B and C respectively, are chained to higher-level states B and C. Therefore, it is easy to understand how a plurality of lower-level states are changed to higher-level states. Normally, lower-level states D and E are changed to higher-level states B and C respectively in this example; however, at change time, if the state of the current specification is the same as that of the next specification, the execution of the next specification starts in that same state. The contents of a higher-level state and the contents of a lower-level state are not hierarchically structured; this means that a higher-level state may be changed to a lower-level state depending upon the contents of a program.

There is no need to provide an interface in embodiment 1 because embodiment 1 has a means which provides an interface between the program and the control object. That is, the program execution section 3 has the event processing section 31 which accepts an event signal from the control object 1, converts the signal to data in a specified format, and then sends the converted data to the program; it also has the action execution section 35 which executes action by converting output data from the program to an action signal to be sent to the control object.

Embodiment 1 also has the specification execution section 32 (corresponds to the specification execution means) which executes a specification based on data generated from an event signal. In addition, the program execution section 3 the priority processing section 33 (corresponds to the change means). When the beginning condition a, b, or c is satisfied, this priority processing section changes the specification 51, 52, or 53 to the next specification 51, 52, or 53 which corresponds to the beginning condition a, b, or c. In addition, the program execution section 3 has the change processing section 34 (corresponds to the beginning condition determination means) which, at change time, determines the beginning condition A-D or E in the next specifications 51, 52, or 53 based on the correspondence.

1-2 Operation and Effect of Embodiment 1

In embodiment 1 which has the above structure, the program is set up and executed as follows:

1-2-1 Program Setup

In embodiment 1, the program data is entered into the program data input section 1 using a state transition model. That is, the user enters specifications, priorities, and a state map representing correspondence from the input unit 11. As the user enters data, the specification input section 12 controls the input operation of specifications in the form of a state transition diagram, the priority input section 13 controls the input operation of priorities and beginning conditions, and the correspondence input section 14 controls the input operation of a state map representing correspondence, respectively. Entered program data is stored in the program storage section 2.

Figure 5:
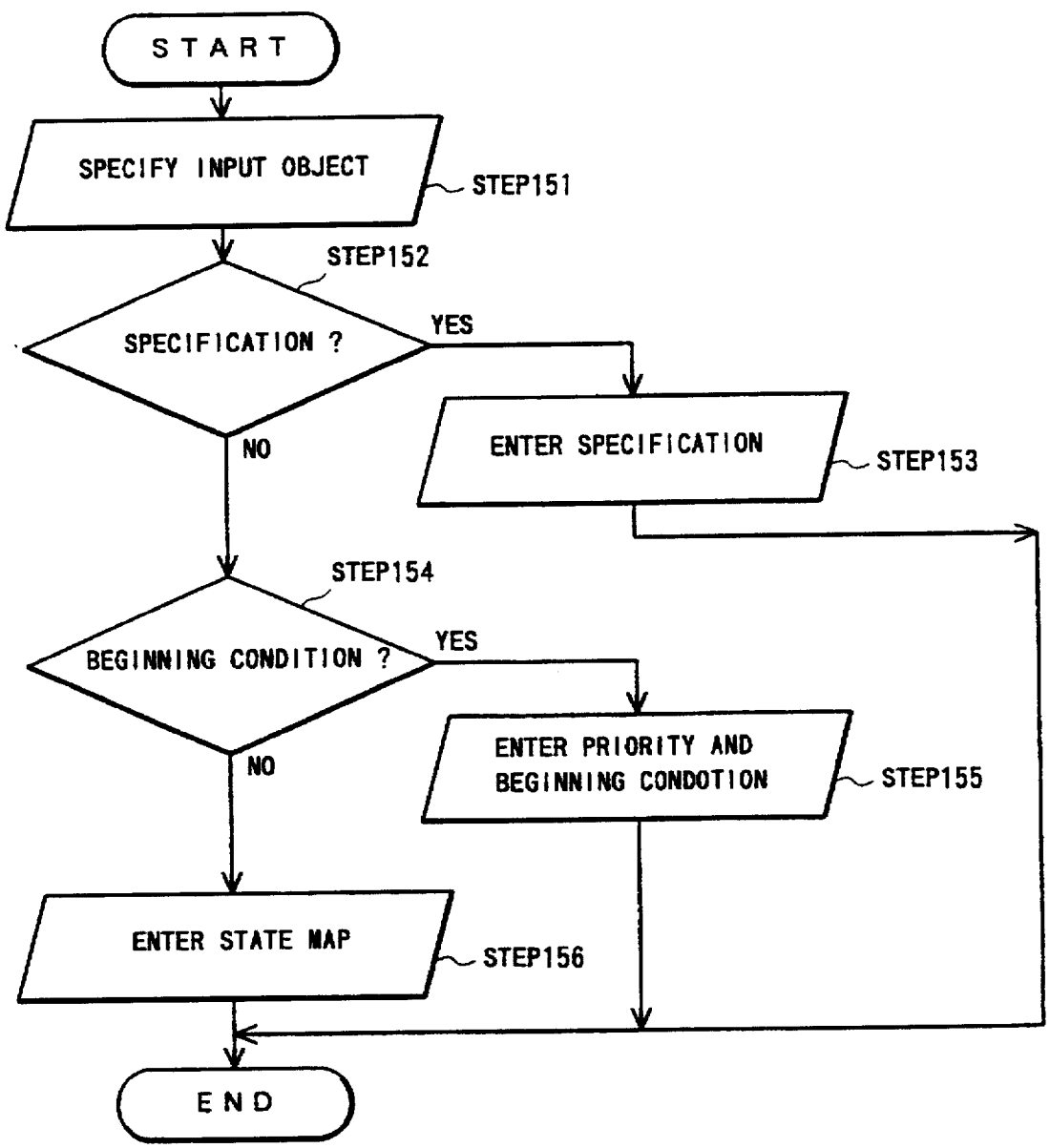
FIG. 5 shows the program data input steps of embodiment 1 of the present invention.

Referring to the flowchart in FIG. 5, there is shown the operation steps of the program data input section 1 in embodiment 1. That is, the user first specifies an input object (step 1), then enters a specification (step 153), priority and beginning condition (step 155), or state map (step 156) according to the specified input object (steps 152, 154).

1-2-2 Program Execution

Figure 6:
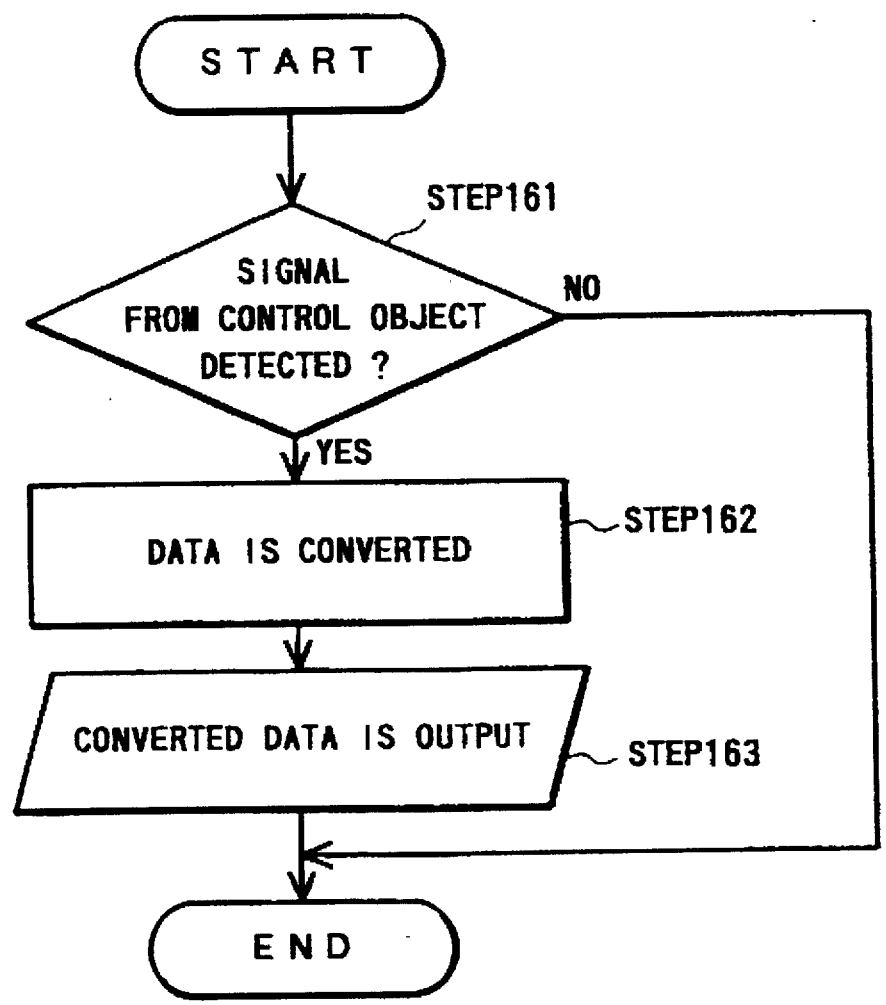
FIG. 6 shows the operation steps of the event processing section.

The program entered as described above is executed in the program execution section 3 as follows. That is, an event signal from the control object X is converted to digital data of a specified format by the event processing section 31, and is sent to the priority processing section 33 and the specification execution section 32. Referring to the flowchart in FIG. 6, there is shown the operation steps of the event processing section 31. In this procedure, upon detecting an event signal from the control object (step 161), signal data is converted to digital data (step 162), and the converted digital data is output to the specification execution section 32 and the priority processing section 33 (step 163).

There are two types of event from the control object X: one type of event causes a state transition within a specification, while other type of event causes a specification to change to the next specification.

The specification execution section 32, which is provided to process the former type of event, causes a state transition corresponding to the event to execute the specification. An event is a type of condition which affects program execution. For example, when specified data is entered or when a variable satisfies a specified condition, an event occurs. When the statement "if X then Y"

is used in a program, X is an event and Y is a resulting action.

1-2-3 Specification Change

Figure 7:
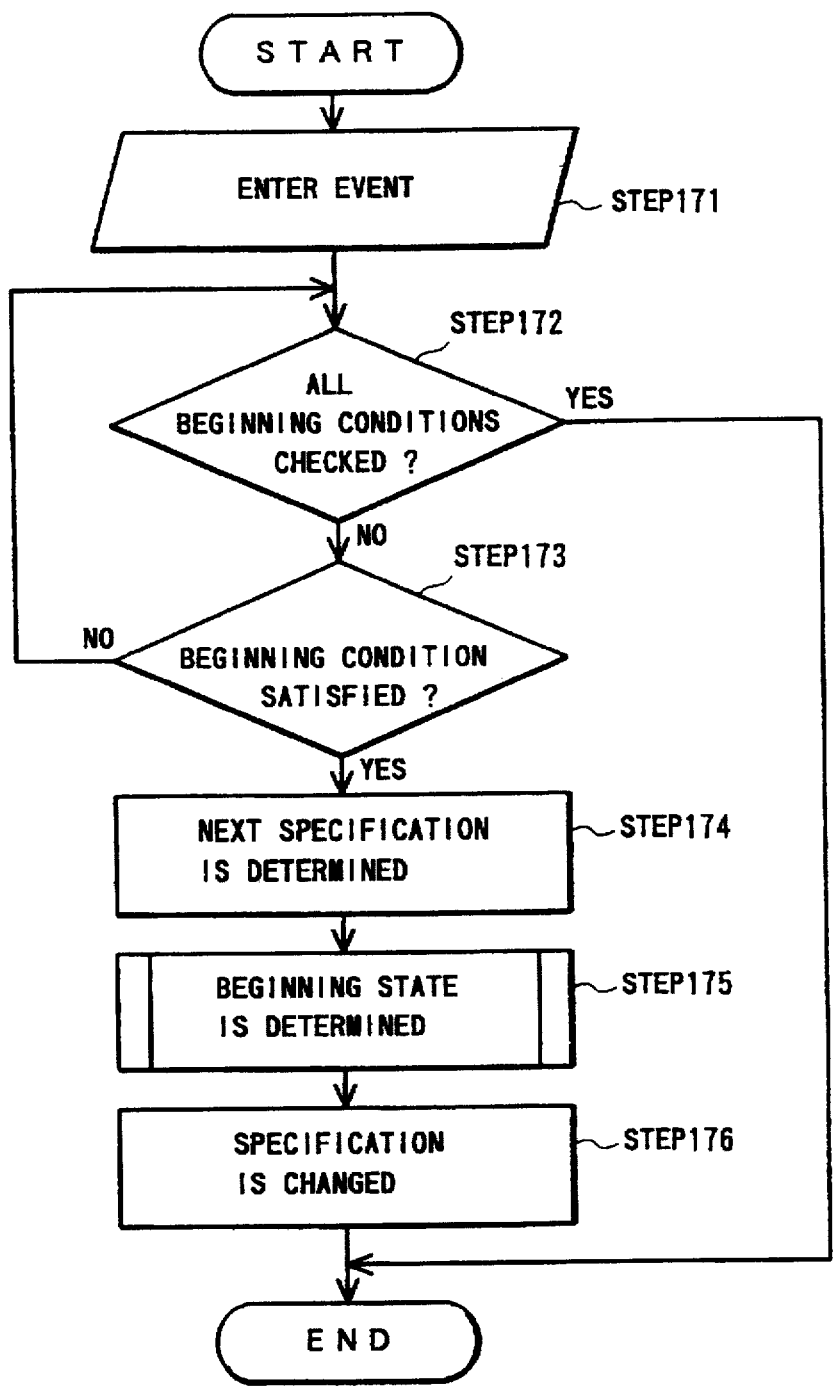
FIG. 7 shows the specification change steps of embodiment 1 of the present invention.

The priority processing section 33 is provided to process an event which causes a state transition. When one of the beginning conditions is satisfied, the priority processing section changes the specification from the current specification to the next specification. Referring to the flowchart in FIG. 7, there is shown the specification change steps. In this procedure, after an event is entered (step 171), the priority processing section 33 determines if the beginning condition is satisfied (step 173) until all the beginning conditions checked(step 172), determines the next specification according to the beginning condition (step 174).

Information about the determined next specification is sent to the specification execution section 32 and the change processing section 34, and the change processing section 34 determines the beginning state of the next specification according to the correspondence data stored in the state map storage means 23 (step 175). When the next specification and the beginning state are determined, the specification execution section 32 executes the next specification from its beginning states (step 176).

In this case, a plurality of beginning conditions may be defined to be satisfied at the same time. When a plurality of beginning conditions are satisfied at the same time, the priority processing section 33 selects one of specifications according to the priority of specifications. This eliminates the need to do a duplication check in each specification. Notice that a plurality of beginning conditions may be defined not to be satisfied at the same time. In this case, priority data may be omitted and therefore processing becomes simple.

Figure 8:
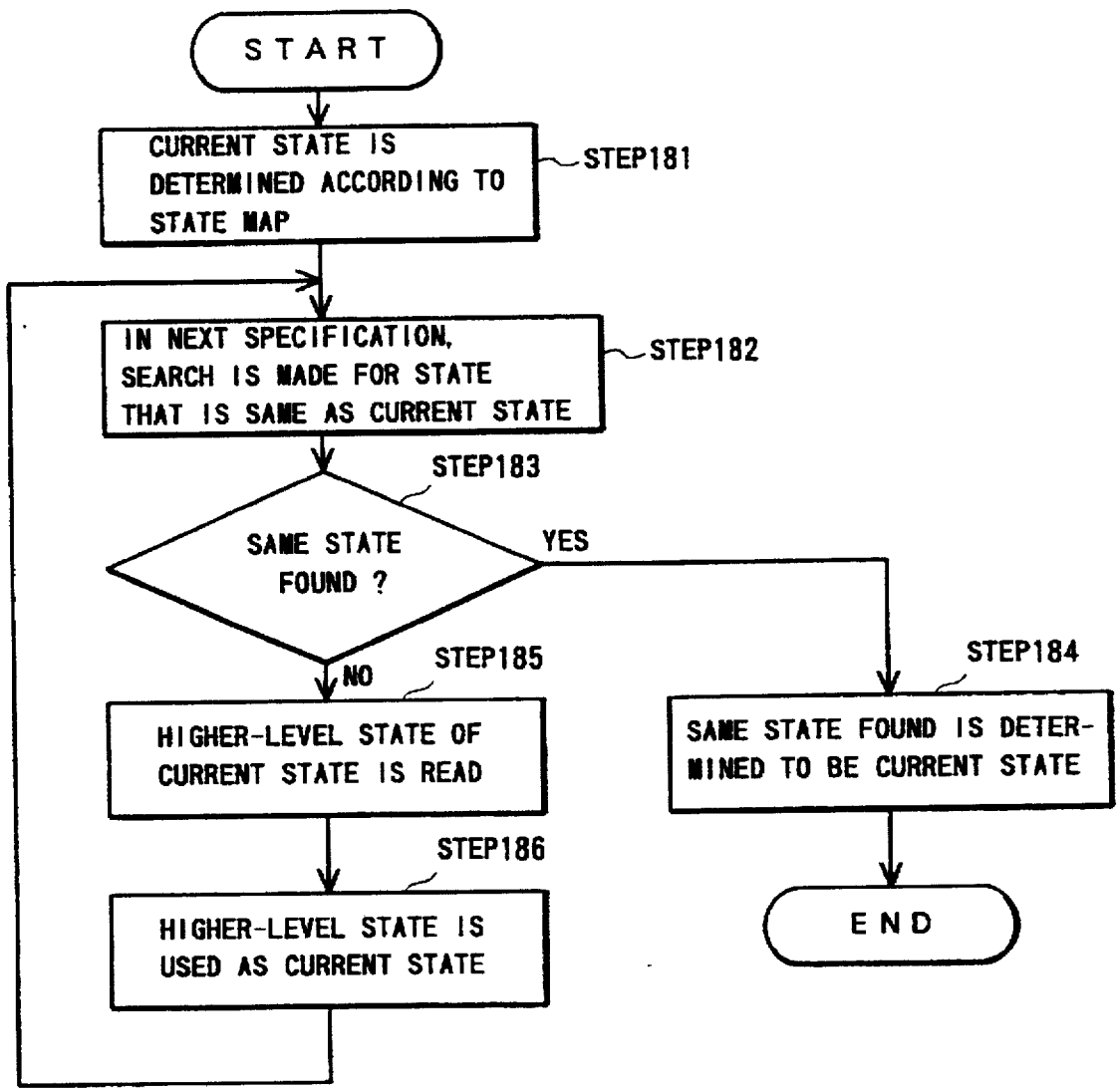
FIG. 8 shows the beginning state determination steps of embodiment 1 of the present invention.

Referring to the flowchart in FIG. 8, there is shown the beginning state determination (step 175 in FIG. 7) steps. In this procedure, a state ID or name is checked in the state map to search for the existing state, and the state that was found is determined to be the current state (step 181). Then, in the next specification, a search is made for the same state as the current state (step 182) and, if the same state as the current state exists in the next specification (step 183), that state is determined to be the beginning state, the same state that was found is defined as the current state (step 184), and then the procedure ends. Therefore, it is necessary to access the state map only when the same state is not found. This simplifies processing and speed up processing.

In step 183, if the same state as the current state does not exist in the next specification, the higher-level state of the current state is read from the state map (step 185) and that state is used as the current sate (step 186). Then, control returns to step 182 to search the next specification for the same state as the new current state. Thus, steps 182 to 186 are repeated to find a beginning state.

Thus, when the procedure in FIG. 8 ends, the current state is the beginning state. That is, the beginning state is not limited to the one at the next higher level of the tree structure. The beginning state may be a state that is two or more levels higher than the current state.

For example, in the example shown in FIGS. 2-4, when the specification 52 is changed to the specification 51 that is higher in priority, the change processing section 34 first determines the state E in the state map as the current state. However, in the specification 51 that is the next specification of the specification 52, the same state E does not exist. This will cause the change processing section 34 to make the next higher state C in the state map the current state. Because the same current state C exists in the specification 51, the state C becomes the beginning state.

Information about a beginning state thus determined by the change processing section 34 is sent to the specification execution section 32 as described before. Then, the specification execution section 32 starts the next specification determined by the priority processing section 33 from the beginning state, and executes the specification via the event processing section 31 and the action execution section 35. When a specification is executed, the action execution section 35 executes action via control commands for control objects. An action executed by the action execution section 35 is partial sequence of the program.

As described above, in embodiment 1, beginning conditions for each specification is not described repeatedly for each state of a specification; instead, one piece of information is provided for a single specification. In addition, when specifications have a common state, one piece of correspondence information is provided for one state correspondence combination. This eliminates the need to repeat beginning conditions for a specification and correspondence data in a specification as a transition condition, making the data structure of a program simple and compact. In addition, because the correspondence is represented as a simple tree structure, the program data structure becomes simpler and more compact.

2. Embodiment 2

In embodiment 2, a program larger than the one used in embodiment 1 is used for a device similar to the one used in embodiment 1. The program explained in embodiment 2 is an elevator control program. An elevator control program is suitable for representing a multiple-specification state transition model in that the operation must be switched among a plurality of operation modes. FIG. 9 shows three specifications comprising the program used in embodiment 2. Of these specifications, the normal operation specification represents a typical, unattended operation. The parking operation specification, which represents an operation outside the business hours such as a midnight, controls the stoppage at a specified floor. The manual operation specification, which represents an operation done manually by an operator, permits specific operations such as door opening wait.

Figure 11:
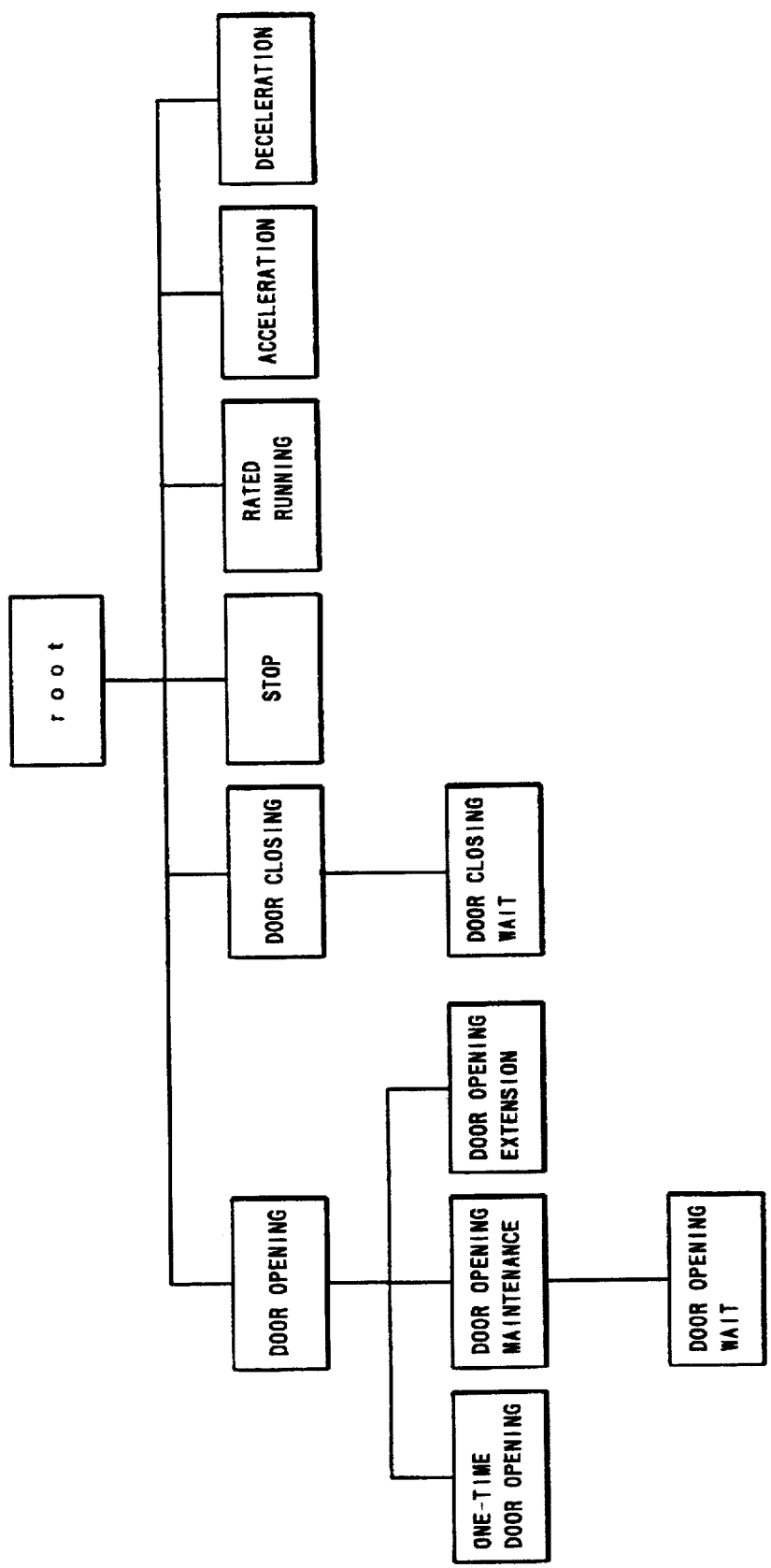
FIG. 11 shows the state map of embodiment 2 of the present invention.
Figure 22:
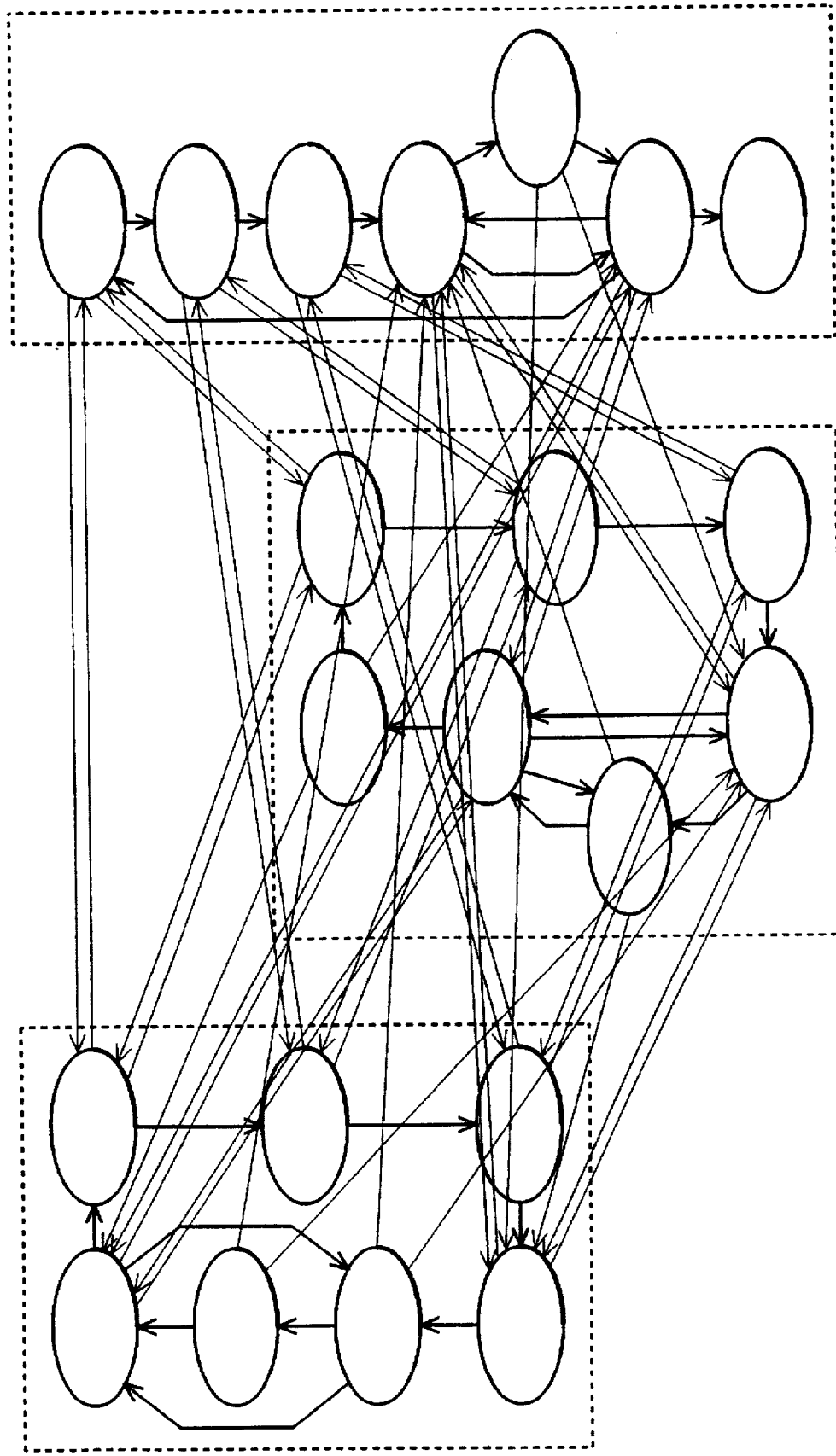
FIG. 22 shows an another example of a specification of a conventional state-transition-model-based programming system.

FIG. 10 shows the beginning conditions for embodiment 2, and FIG. 11 shows the state map for embodiment 2. The program used in embodiment 2 is executed according to a procedure similar to the one used in embodiment 1. There are as many states and transitions in the program (FIG. 9) used in embodiment 2 as there are in the specifications of a conventional state-transition-model-based programming system shown in FIG. 22. However, the contents of the specifications shown in FIG. 9, the beginning conditions of each specification shown in FIG. 10, and the correspondence shown in FIG. 11 are so simple and compact that it is easy to understand. Thus, as compared with a conventional state-transition-model-based programming system, it becomes more apparent that the data structure of a program according to the present invention becomes more compact as the program becomes larger.

3. Other Embodiments

The present invention is not limited to the embodiments described above, but it may be applied to other embodiments described below. For example, in the embodiments described above, the input unit 11 such as a keyboard is used as a specification input means and a correspondence input means, and the specification input section 12 and correspondence input section 14 are used to control the input operation. However, a recording medium for recording specifications and correspondence data as well as a reader which reads specifications and correspondence data from this recording medium may be used as a specification input means and a correspondence input means.

For example, the floppy disk drive along with the program execution section are installed beforehand in a control object such as an elevator. The program itself is entered at another place by using a development system such as an emulator which simulates the operation of the control object. The entered program is written on a floppy disk, and the maintenance operator takes this floppy disk to a place where the control object is installed. Then, this disk is mounted on the drive and the program is read for execution in this case. The program read from the disk is stored into the RAM of the correspondence-oriented state-transition-model-based programming system for execution. Use of a floppy disk makes it easy to mount and, in addition, prevents the recording contents from being destroyed by static electricity.

An ROM installation socket may be used instead of this floppy disk drive. That is, an ROM chip package containing the program is mounted on a socket on the control object. In this way, this package serves as the input means and the storage means, making the correspondence-oriented state-transition-model-based programming system still simpler. In addition, a compact ROM chip package is easy to port and reduces the unit size.

The method described above not only eliminates the need for installing an input unit such as a keyboard at the installation place of a control object (target machine), but also allows the program to be developed in an environment suitable for program development. In addition, because the program is easily entered at the installation place of a control object, the maintenance time for the control object such as an elevator is reduced and its operation efficiency is increased.

A control object of this program may be applied not only to an elevator but also to many other fields such as an airplane automatic navigation system, power plant, power transmission site, communication system, and chemical plant. In addition, a control object of this program is not limited to concrete objects; that is, it may be applied to non-concrete objects such as computer data files and tasks in a multitask computer system.

Figure 12:
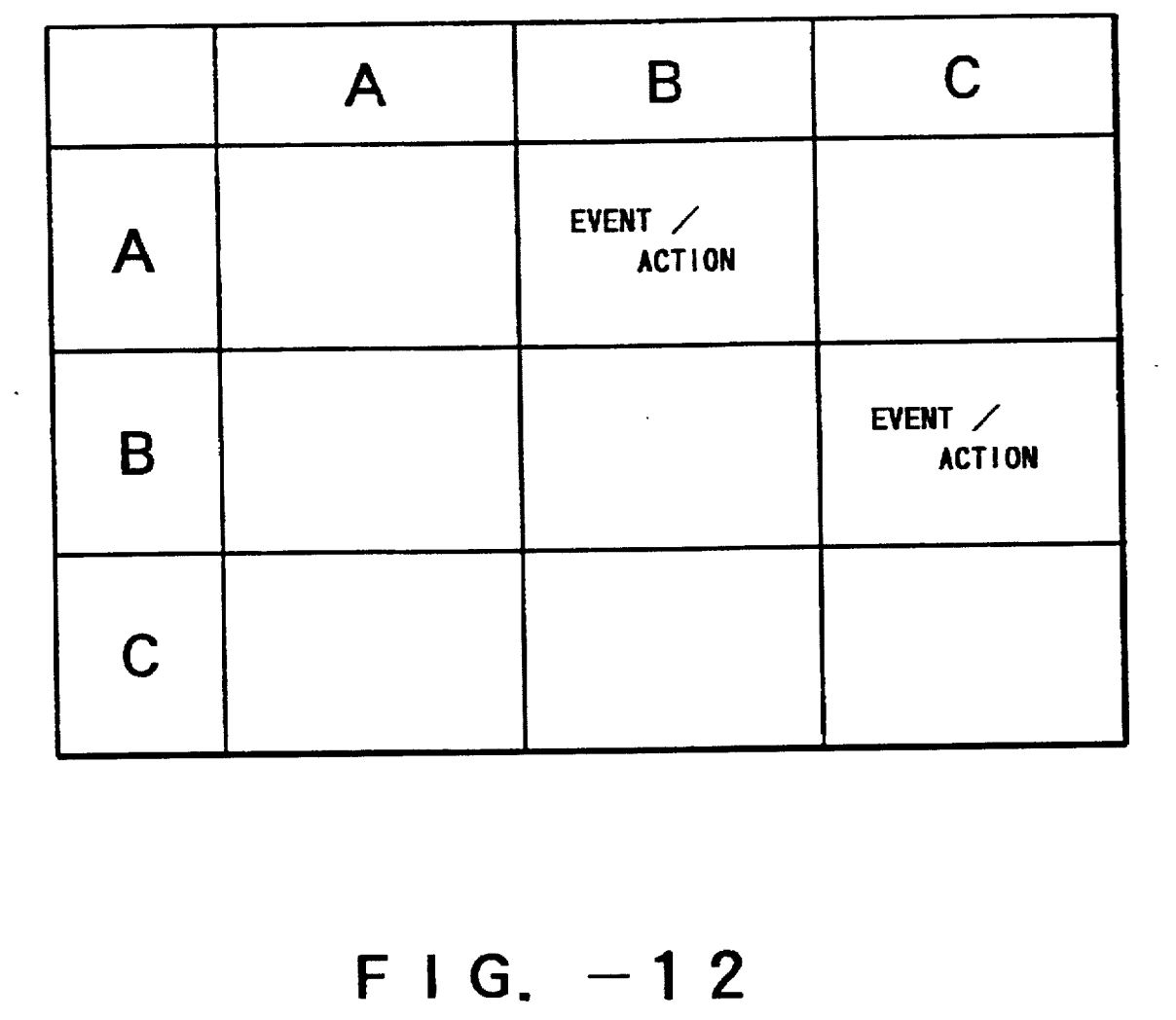

A state transition model means all the formats that can represent the contents of a program by transitions among a plurality of sates. The state transition diagrams shown in FIG. 2 and FIG. 9 are one type of state transition model representations. For example, a sate transition model can be represented by various chart formats, and the input, display, or edit screen can be designed freely. For example, when a state transition model is represented as a state chart as shown in FIG. 12, it is easy to understand the contents of transition events and actions. In this Figure, the vertical column and the horizontal column represent the state names of the transition sources and transition destinations, respectively. When a transition from a transition source to a transition destination exists, an event associated with the transition as well as an action to be performed are indicated at the intersection of the transition source and the transition destination. In addition, in a state transition diagram, the shape of a frame indicating a state or the shape of an arrow indicating a transition between states are free; for example, a state may be represented by a polygon.

A state map may be any format that can represent tree-structured data. The tree-structured data format shown in FIG. 11 is one type of representation. A state map that is used as internal data of each embodiment may be represented as a data string as follows. That is, the relationship between states is represented by unit data each represents a state. Unit data is composed of the data part STATE which represents a state name, the data part [CHILDREN] which specifies the lower state of the state, and data part [SIBLINGS] which specifies another state that is connected to the higher state of the state.

STATE [CHILDREN] [SIBLINGS]

[CHILDREN] of the state STATE specifies the lower state of the state. When another lower state connected to the same higher state exists, the lower state [SIBLINGS] specifies the lower state.

Although "or" is used in embodiment 2 as an example of a compound condition (FIG. 10), the format of a compound condition is not limited to OR; AND, XOR, and other types of format may be used.

Figure 13:
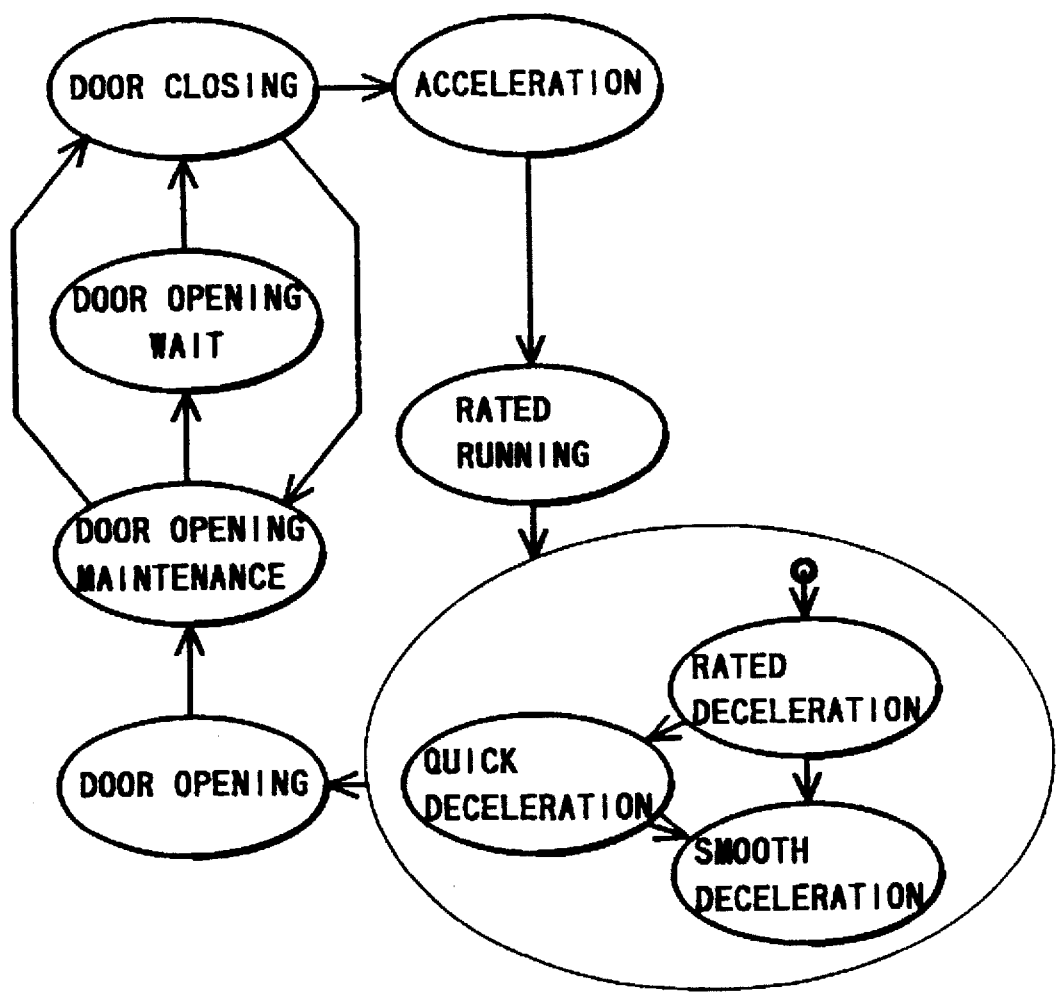
FIGS. 13–15 show some examples of specifications composed of specific lowest-layer states of other embodiments of the present invention.
Figure 14:
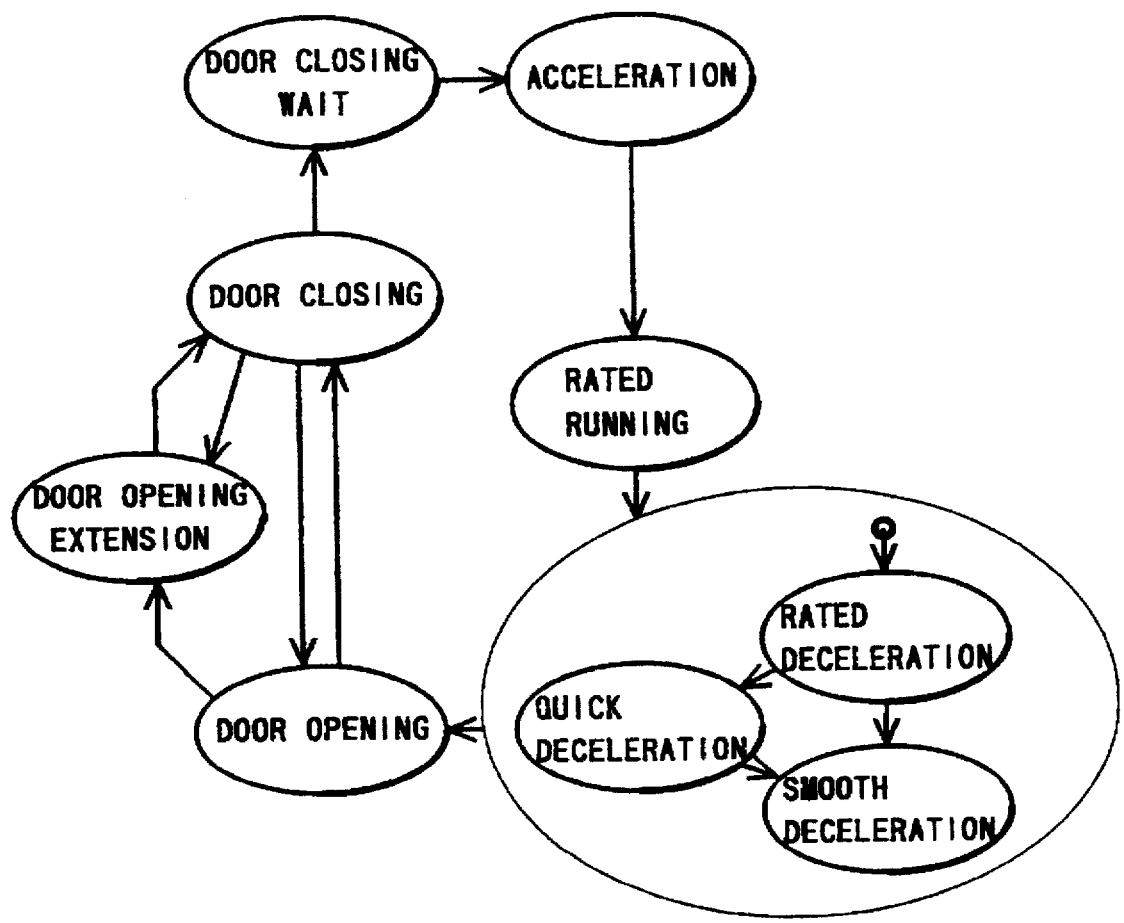
Figure 15:
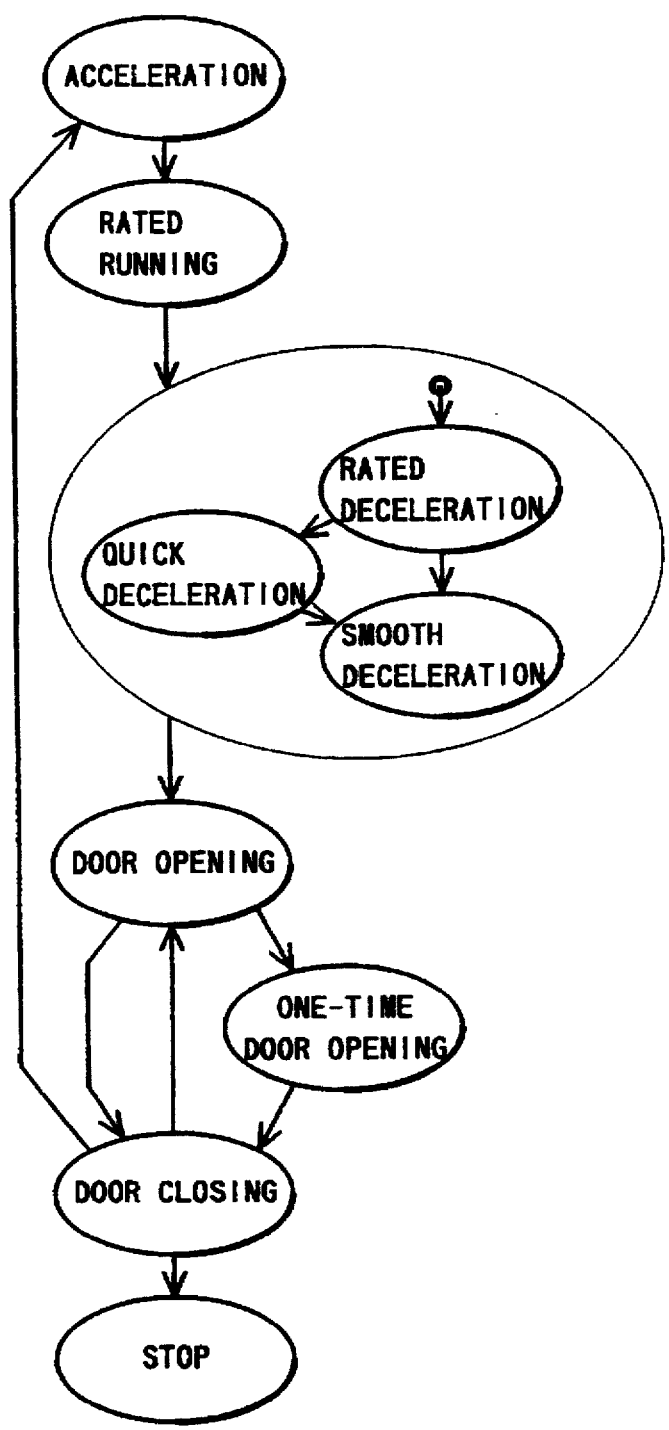
Figure 16:
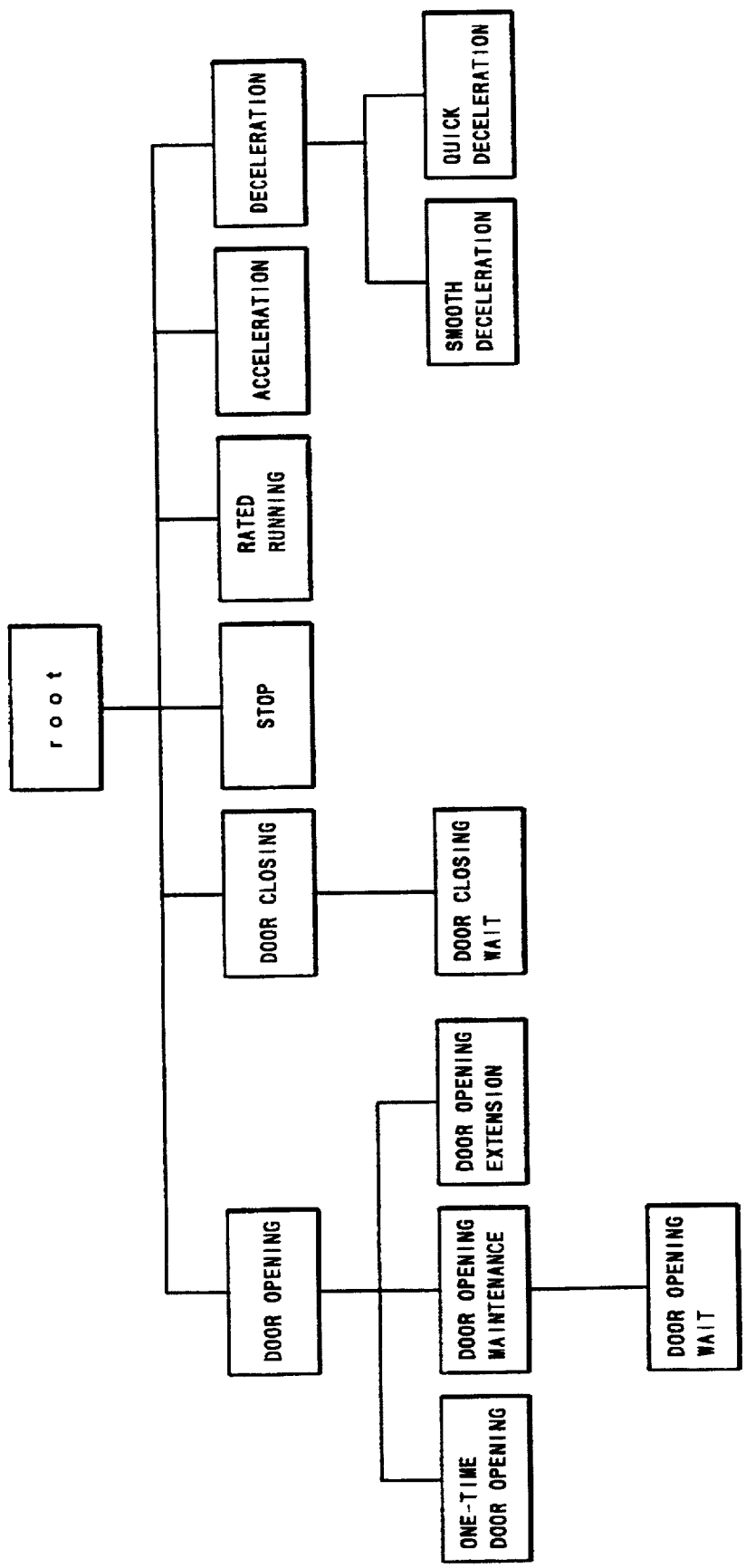
FIG. 16 shows an example of a state map corresponding to each of the specifications shown in FIGS. 13–15.
Figure 17:
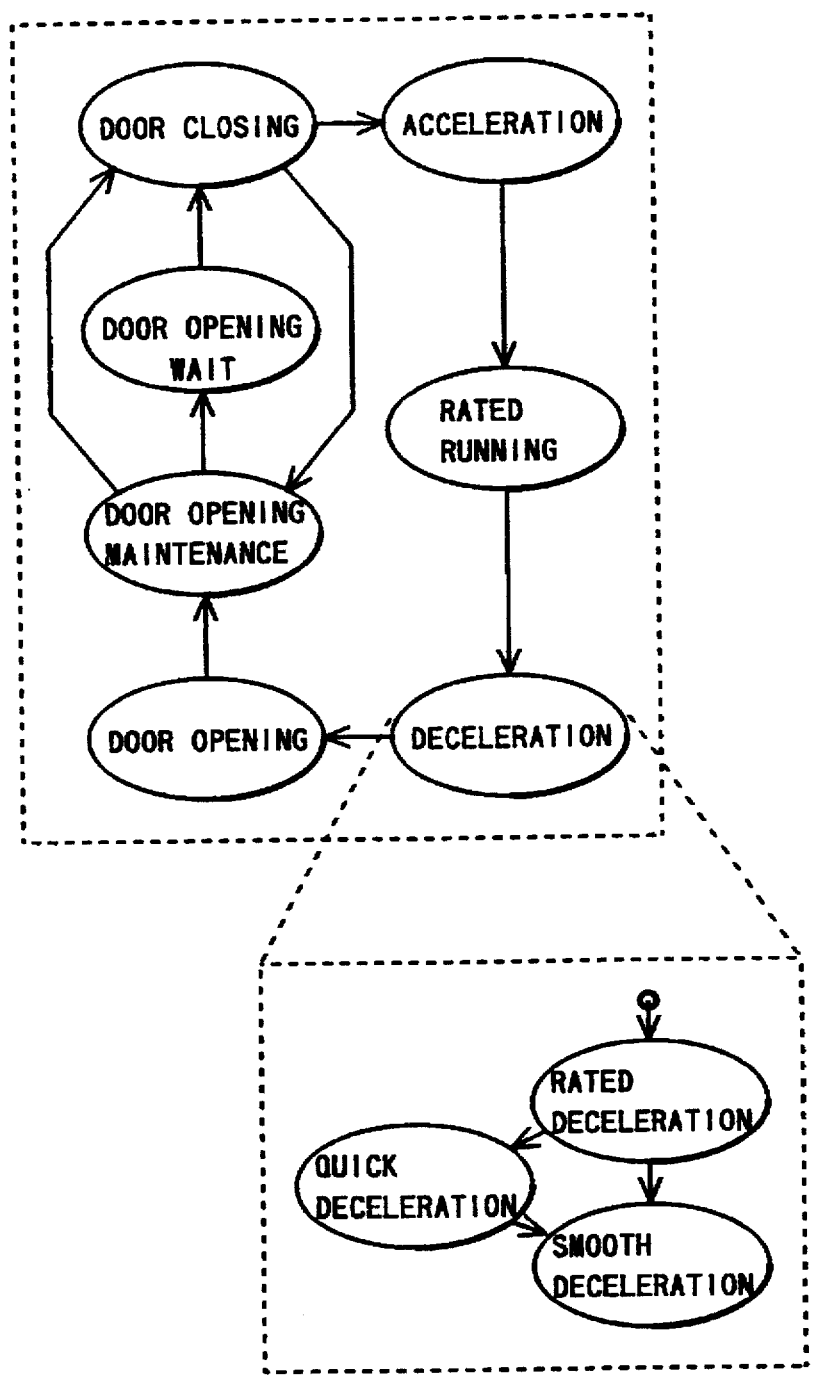
FIGS. 17–19 show some examples of specifications where a state of a particular layer represents a state of the lower layer.
Figure 18:
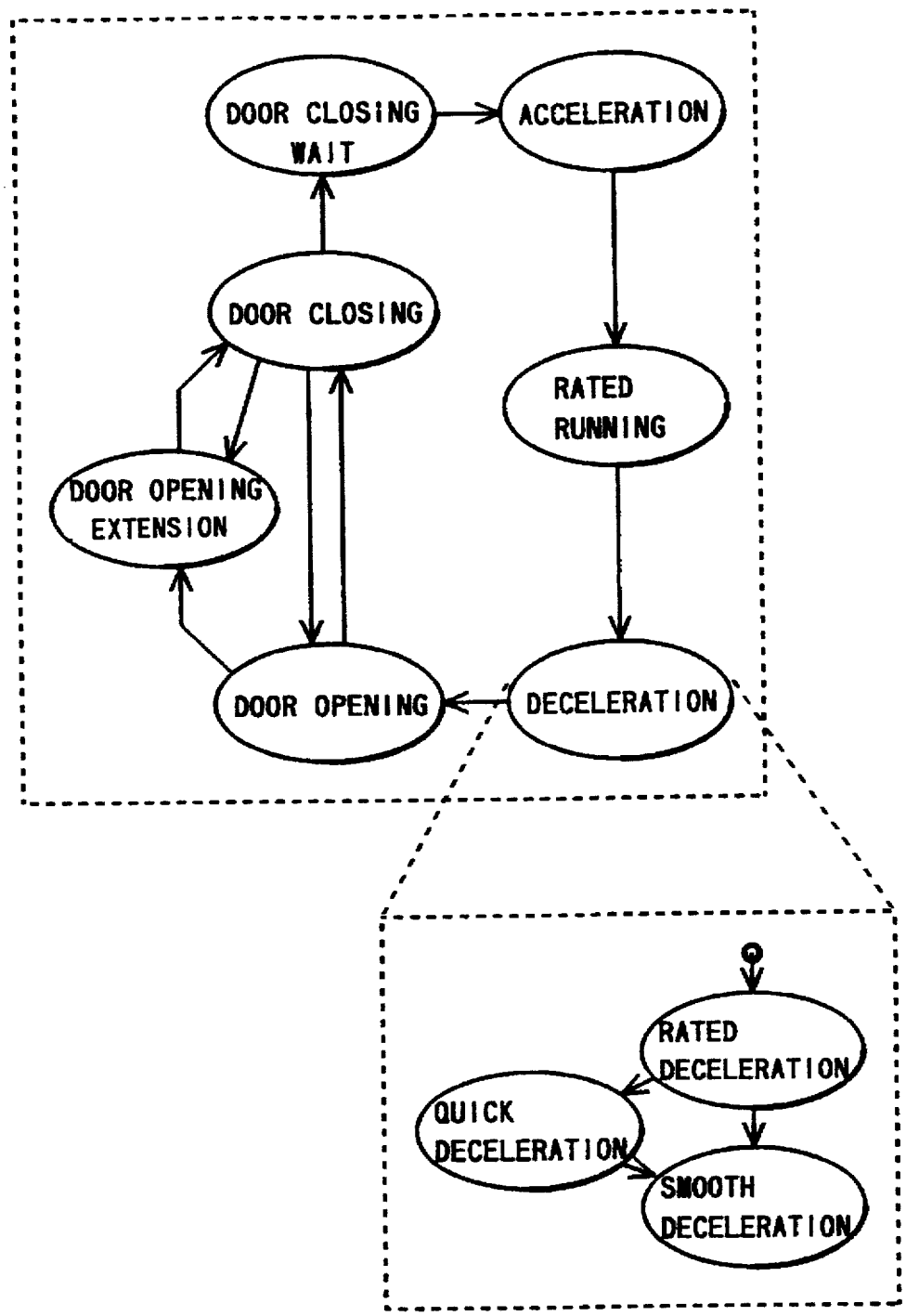
Figure 19:
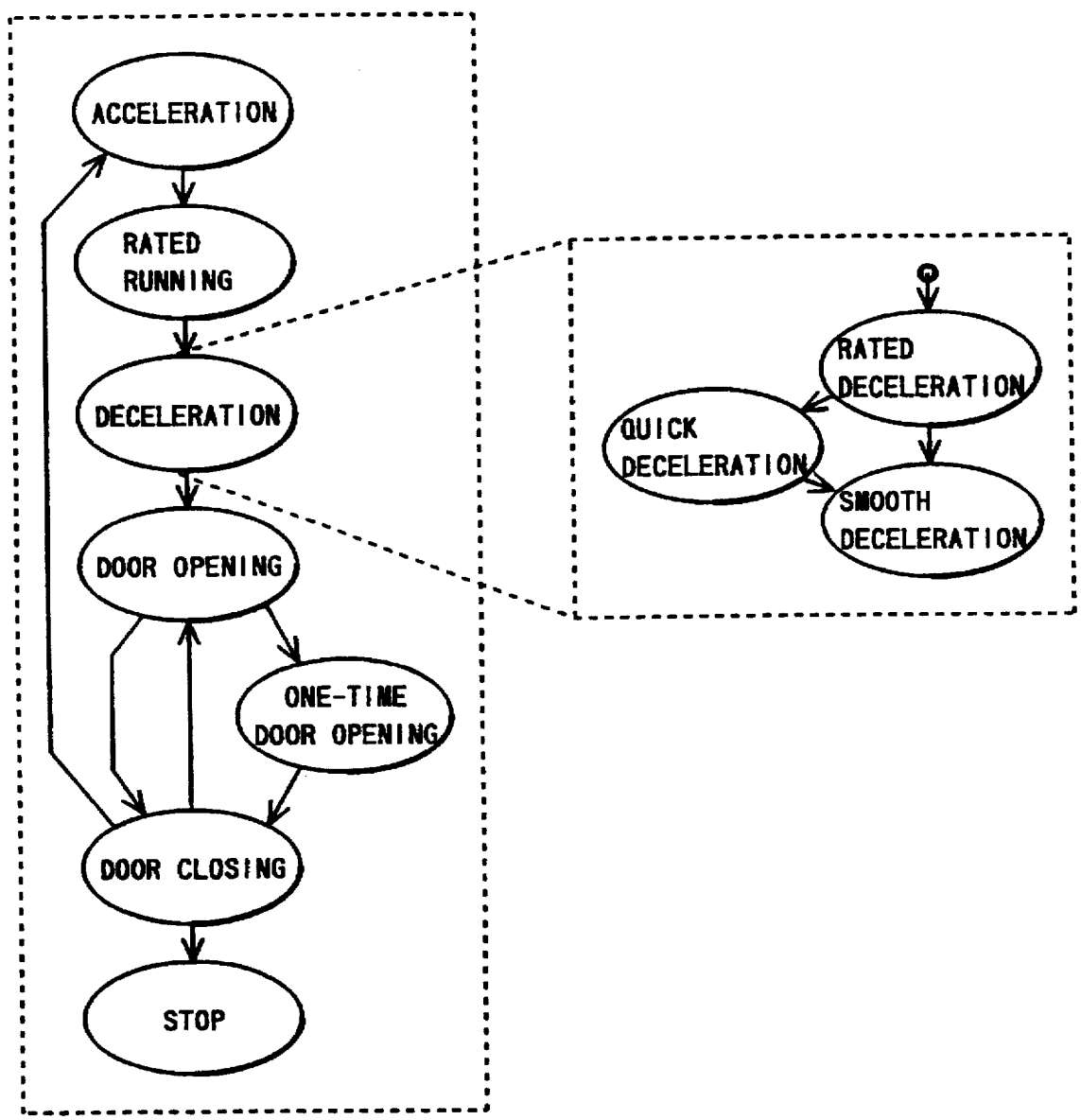
Figure 20:
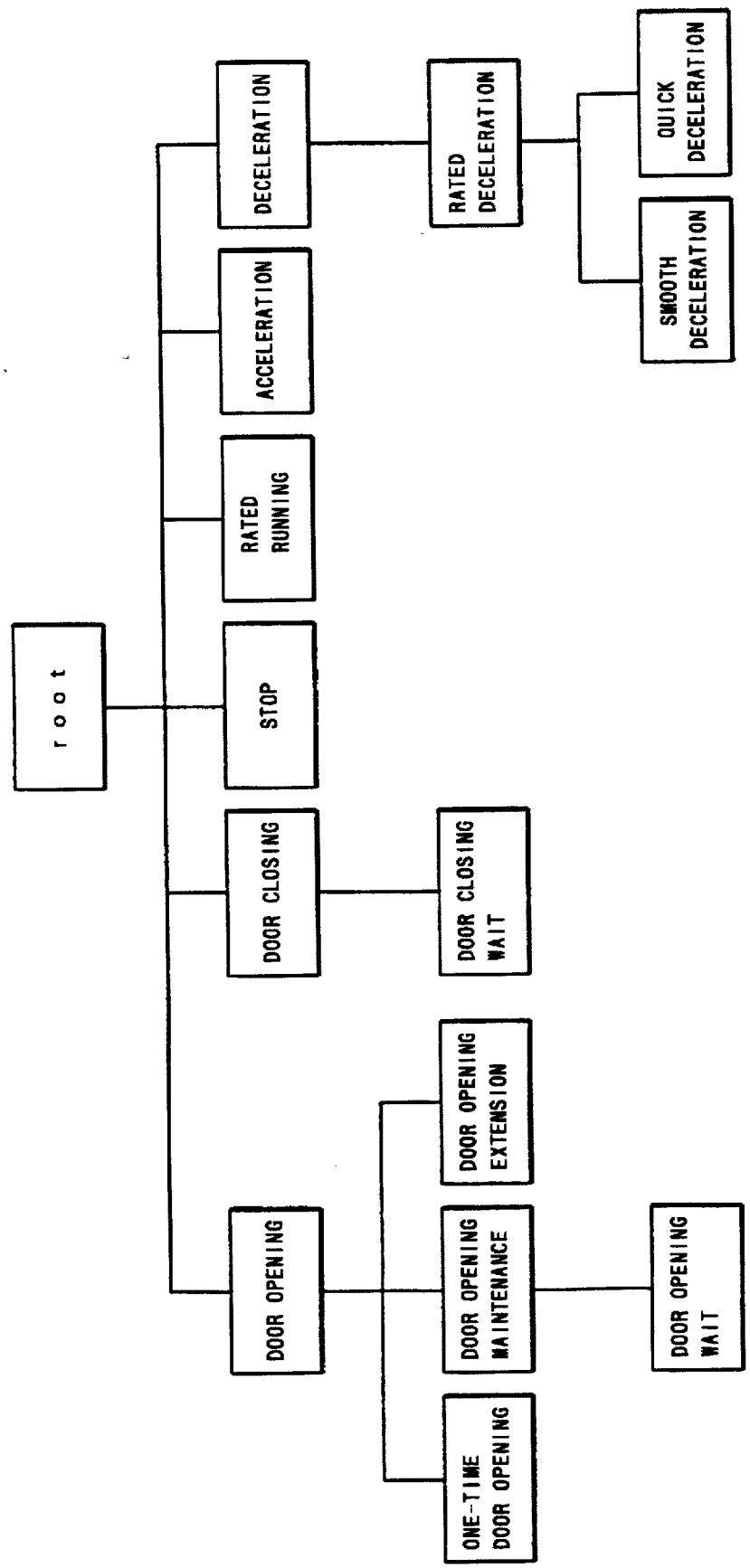
FIG. 20 shows a example of a state map corresponding to the specifications shown in FIGS. 17–19.

States may be hierarchically structured. For example, a state composing a specification is composed of a plurality of lower states, and a state map is composed, for example, of the lowest states. FIGS. 13–15 show examples of specifications composed of the lower states, and FIG. 16 shows an example of a state map corresponding to each specification. In addition, the state of a particular level may be composed of its lower levels. FIGS. 17–19 show examples of specifications structured in this manner, and FIG. 20 shows an example of a state map corresponding to the specifications shown in FIGS. 17–19.

And, specification change is done according to the state of the lowest level or a particular level. This method may be used in a large hierarchically-structured system, and makes it possible to implement a multi-stage structured program. Any number of levels (for example, 4 or 5 levels) may be used, and different number of levels may be used in different parts of a program.

When the present invention is implemented on a computer, it is desirable that a multi-process computer that is enabled for hardware interrupts be used and that specification change be done in the supervisor mode independently of specification execution. This enables supervisor to restore the program even when a specification fails due to an error and to prevent the whole program from being hung, thereby increasing system reliability.

INDUSTRIAL ADVANTAGES

As described above, the present invention provides a correspondence-oriented state-transition-model-based programming system using simple and compact program data structures. Therefore, a program becomes easy to understand, and the cost may be lowered.

What is claimed is:

1. A correspondence-oriented state-transition-model-based programming system comprising:
   a specification input means for reading a plurality of specifications that can be changed and executed according to specified beginning conditions in the form of state transition models, each consisting of a plurality of states and the transitions among states;
   a specification execution means for executing a specification;
   a change means for changing a current specification to a next specification when a beginning condition is satisfied during execution of said current specification;
   a correspondence input means for reading correspondence between a state of said current specification and a beginning state where said next specification is to begin if said current specification is changed;
   and beginning state determination means for determining said beginning state of said next specification according to said correspondence when said current specification is changed.

2. A correspondence-oriented state-transition-model-based programming system as claimed in claim 1, characterized in that said beginning conditions are defined exclusively.

3. A correspondence-oriented state-transition-model-based programming system as claimed in claims 2, characterized in that said specification input means is structured such that said beginning conditions are entered using a display screen in the tabular format.

4. A correspondence-oriented state-transition-model-based programming system as claimed in claim 1, wherein said beginning conditions are allowed to be satisfied at the same time and, when a plurality of said beginning conditions are satisfied at the same time, one specification is selected by said change means according to a priority among specifications.

5. A correspondence-oriented state-transition-model-based programming system as claimed in claims 4, characterized in that said specification input means is structured such that said beginning conditions are entered using a display screen in the tabular format.

6. A correspondence-oriented state-transition-model-based programming system as claimed in claim 1, characterized in that said specification Input means is structured such that said state transition models are entered using a display screen in the chart format.

7. A correspondence-oriented state-transition-model-based programming system as claimed in claim 6, characterized in that said specification input means reads said specification using said display screen in the format where said state is represented by a node and a transition between states is represented an arc between said nodes.

8. A correspondence-oriented state-transition-model-based programming system as claimed in claim 6, characterized in that said specification input means is structured such that said specification is entered using said display screen in the format of a state chart.

9. A correspondence-oriented state-transition-model-based programming system as claimed in claim 1 comprising:

a specification storage means for storing said specifications;

and a correspondence storage means for storing said correspondence.

10. A correspondence-oriented state-transition-model-based programming system as claimed in claim 1 comprising the program and an interface means for access as an interface between the program and a control object.

11. A correspondence-oriented state-transition-model-based programming system as claimed in claim 10 characterized by comprising:

in that said interface means consists of the event processing section converting an event signal sent from a control object to data to be input to the program and the action execution section converting output data sent from the program to an action signal to be sent to said control object.

12. A correspondence-oriented state-transition-model-based programming system comprising:

a specification execution means for executing a specification;

a change means for changing a current specification to a next specification when a beginning condition is satisfied during execution of said current specification;

a correspondence input means for reading correspondence between a state of said current specification and a beginning state where said next specification is to begin if said current specification is changed;

and beginning state determination means for determining said beginning state of said next specification according to said correspondence when said current specification is changed;

and said correspondence is represented by tree-structured data comprising data components connected from higher levels to lower levels or to branches connecting multiple lower levels.

13. A correspondence-oriented state-transition-model-based programming system as claimed in claim 2, characterized by said specifications are hierarchically structured.

14. A correspondence-oriented state-transition-model-based programming system as claimed in claim 12, characterized in that, when the same state exists in the next specification and current specification, said change means uses the same beginning state in the next specification.

15. A correspondence-oriented state-transition-model-based programming system comprising:

a specification input means for reading a plurality of specifications that can be changed and executed according to specified beginning conditions in the form of state transition models, each consisting of a plurality of states and the transitions among states;

a specification execution means for executing a specification;

a change means for changing a current specification to a next specification when a beginning condition is satisfied during execution of said current specification;

a correspondence input means for reading correspondence between a state of said current specification and a beginning state where said next specification is to begin if said current specification is changed;

and beginning state determination means for determining said beginning state of said next specification according to said correspondence when said current specification is changed;

and said correspondence is represented by tree-structured data comprising data components connected from higher levels to lower levels wherein a higher level state of said tree-structured data represents said current specification and a lower level state of said tree structured data represents said next specification and contains a correspondence between said current specification and said next specification.

16. A correspondence-oriented state-transition-model-based program execution, characterized by step 1 reading a plurality of specifications to be changed and executed according to specified beginning conditions in the format of state transition models each consisting of a plurality of states and the transitions among these states, step 2 entering a correspondence between a state in a current specification and a beginning state where a next specification is to begin execution after changing specifications, step 3 executing said current specification, step 4 changing said current specification to said next specification when a beginning condition of said next specification is satisfied, and step 5 determining said beginning state in said next specification at said changing step according to a correspondence entered at said entering step.

17. A correspondence-oriented state-transition-model-based programming system comprising:

a specification execution means for executing one of a plurality of specifications each of which is represented by a plurality of states and at least one transition among these states;

a change means for changing a current specification to a next specification when a specified condition is satisfied during execution of said current specification; and beginning state determination means for determining a beginning state where said next specification is to begin according to stored correspondence data representing correspondence between a state of said current specification and said beginning state if said current specification is changed.

18. A correspondence-oriented state-transition-model-based programming system as claimed in claim 17, wherein said specified condition is uniquely satisfied.

19. A correspondence-oriented state-transition-model-based programming system as claimed in claim 17, wherein, when a plurality of conditions as said specified condition are satisfied at the same time, one specification is selected by said change means according to a priority among specifications.

20. A correspondence-oriented state-transition-model-based programming system as claimed in claim 19, further comprising a condition input means for reading said specified condition.

21. A correspondence-oriented state-transition-model-based programming system as claimed in claim 17, further comprising a condition input means for reading said specified condition.

22. A correspondence-oriented state-transition-model-based programming system as claimed in claim 17, further comprising a specification input means for reading each of said plurality of specification using a display screen in chart format.

23. A correspondence-oriented state-transition-model-based programming system as claimed in claim 22, wherein said specification input means is structured such that each of said plurality of specifications are entered using said display screen in a state transition diagram format where said plurality of states are represented by nodes and said at least one transition is represented by at least one arc between said nodes.

24. A correspondence-oriented state-transition-model-based programming system as claimed in claim 22, wherein said specification input means is structured such that each of said plurality of specifications are entered using said display screen in a state chart format.

25. A correspondence-oriented state-transition-model-based programming system as claimed in claim 17, further comprising an interface means for access as an interface between a program and a control object.

26. A correspondence-oriented state-transition-model-based programming system as claimed in claim 25, wherein said interface means including an event processing section for converting an event signal sent from a control object to data to be input to said program and an action execution section for converting output data sent from said program to an action signal to be sent to said control object.

27. A correspondence-oriented state-transition-model-based programming system comprising:
 a first storage means for storing a plurality of specifications each of which is represented by a plurality of states and at least one transition among these states;
 a second storage means for storing a correspondence between a state of a current specification and a beginning state where a next specification is to begin if said current specification is changed;
 a specification execution means for executing one of said plurality of specifications;
 a change means for changing said current specification to said next specification when a specified condition is satisfied during execution of said current specification; and
 beginning state determination means for determining said beginning state of said next specification according to said correspondence stored in said second storage means when said current specification is changed.

28. A correspondence-oriented state-transition-model-based programming system as claimed in claim 27, wherein said second storage means stores said correspondence in a tree-structured data format comprising data components connected from higher levels to lower levels or to branches connecting multiple lower levels.

29. A correspondence-oriented state-transition-model-based programming system as claimed in claim 27, wherein said plurality of states of said plurality of specifications are hierarchically structured and that said second storage means stores said correspondence in a hierarchically-structured data format.

30. A correspondence-oriented state-transition-model-based programing system as claimed in claim 27, wherein, when a corresponding state in said next specification exists in relation to a state of said current specification, said change means uses the corresponding state as said beginning state of said next specification.

31. A correspondence-oriented state-transition-model-based program execution method comprising the steps of:
 executing one of a plurality of specifications each of which is represented by a plurality of states and at least one transition among these states;
 changing a current specification to a next specification when a specified condition is satisfied during execution of said current specification at said executing step; and
 determining a beginning state where said next specification is to begin according to stored correspondence data representing correspondence between a state of said current specification and said beginning state if said current specification is changed at said changing step.

32. A correspondence-oriented state-transition-model-based program execution method as claimed in claim 31, wherein said specified condition in said changing step is uniquely satisfied.

33. A correspondence-oriented state-transition-model-based program execution method as claimed in claim 31, wherein, when a plurality of conditions as said specified condition are satisfied concurrently, one specification is selected at said changing step according to a priority among specifications.

34. A correspondence-oriented state-transition-model-based program execution method as claimed in claim 33, further comprising the step of reading said specified condition.

35. A correspondence-oriented state-transition-model-based program execution method as claimed in claim 31, further comprising the step of reading said specified condition.

36. A correspondence-oriented state-transition-model-based program execution method as claimed in claim 31, further comprising the step of reading each of said plurality of specifications using a display screen in chart format.

37. A correspondence-oriented state-transition-model-based program execution method as claimed in claim 36, wherein, at said reading step, each of said plurality of specifications are entered using said display screen in a state transition diagram format where said plurality of states are represented by nodes and said at least one transition is represented at least one arc between said nodes.

38. A correspondence-oriented state-transition-model-based program execution method as claimed in claim 36, wherein, at said reading step, each of said plurality of specifications are entered using said display screen in state chart format.

39. A correspondence-oriented state-transition-model-based program execution method as claimed in claim 31, further comprising the step of providing an interface between a program and a control object.

40. A correspondence-oriented state-transition-model-based program execution method as claimed in claim 39, wherein said providing step includes the substeps of:
 converting an event signal sent from a control object to data to be input to said program; and
 converting output data sent from said program to an action signal to be sent to said control object.

41. A correspondence-oriented state-transition-model-based program execution method comprising:
 storing a plurality of specifications each of which is represented by a plurality of states and at least one transition among these states;
 storing a correspondence between a state of a current specification and a beginning state where a next specification is to begin if said current specification is changed;
 executing one of said plurality of specifications;
 changing said current specification to said next specification when a specified condition is satisfied during execution of said current specification at said executing step; and determining said beginning state of said next specification according to said correspondence stored in said second storage means when said current specification is changed at said changing step.

42. A correspondence-oriented state-transition-model-based program execution method as claimed in claim 41, wherein, at said step of storing a correspondence, said correspondence is stored in tree-structured data comprising data format components connected from higher levels to lower levels or to branches connecting multiple lower levels.

43. A correspondence-oriented state-transition-model-based program execution method as claimed in claim 41, wherein said plurality of states of said plurality of specifications are hierarchically structured and, at said step of storing a correspondence, said correspondence is stored in a hierarchically-structured data format.

44. A correspondence-oriented state-transition-model-based program execution method as claimed in claim 41, wherein, when a corresponding state in said next specification exists in relation to said state of said current specification, the corresponding state is used as said beginning state of said next specification at said changing step.

* * * * *